(12) United States Patent
Takahashi

(10) Patent No.: US 9,256,439 B2
(45) Date of Patent: Feb. 9, 2016

(54) PARALLEL PROCESSING OF TWO-DIMENSIONAL DATA, STORAGE OF PLURAL DATA OF THE PROCESSING RESULTS IN A CACHE LINE AND TRANSFER OF THE DATA TO A MEMORY AS IN THE CACHE LINE

(75) Inventor: Hirokazu Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 946 days.

(21) Appl. No.: 13/443,465

(22) Filed: Apr. 10, 2012

(65) Prior Publication Data

US 2012/0290815 A1  Nov. 15, 2012

(30) Foreign Application Priority Data

May 13, 2011  (JP) ................ 2011-108733

(51) Int. Cl.
*G06F 9/345* (2006.01)
*G06F 9/38* (2006.01)
*G06F 12/08* (2006.01)
*G06T 1/60* (2006.01)
*G06F 12/02* (2006.01)

(52) U.S. Cl.
CPC .............. *G06F 9/3885* (2013.01); *G06F 9/345* (2013.01); *G06F 12/0284* (2013.01); *G06F 12/0842* (2013.01); *G06F 12/0886* (2013.01); *G06T 1/60* (2013.01); *G06F 12/0875* (2013.01); *G06F 2212/1016* (2013.01); *G06F 2212/455* (2013.01)

(58) Field of Classification Search
CPC ........................ G06F 12/0802–12/0806; G06F 12/0844–12/0851; G06F 2212/601; G06F 9/3824; G06F 12/1045–12/1054; G06F 12/10; G06F 9/3885; G06F 12/02–12/0207; G06F 12/0868–12/0873; G06F 9/30007
See application file for complete search history.

(56) References Cited

U.S. PATENT DOCUMENTS

| | | | |
|---|---|---|---|
| 5,829,032 A | 10/1998 | Komuro et al. | |
| 6,963,953 B2 | 11/2005 | Nakajima | |
| 2003/0110360 A1 | 6/2003 | Nakajima | |
| 2009/0164728 A1* | 6/2009 | Kajigaya | ........................ 711/118 |

FOREIGN PATENT DOCUMENTS

| | | | |
|---|---|---|---|
| JP | 08-185359 A | 7/1996 | |
| JP | 2003-177962 A | 6/2003 | |
| JP | 2004-252728 A | 9/2004 | |
| JP | 2010-73210 A | 4/2010 | |

* cited by examiner

*Primary Examiner* — Kenneth Kim
(74) *Attorney, Agent, or Firm* — Fitzpatrick, Cella, Harper & Scinto

(57) ABSTRACT

A data processing apparatus causes multiple processors to process in parallel input data that is arrayed two-dimensionally, and stores the data of the processing results in a cache line of a cache memory, where the data of the processing results includes a plurality of pieces of data of a predetermined width that is smaller than a cache line width of the cache memory. The data stored in the cache memory is then transferred together to a main memory as in the cache line.

7 Claims, 9 Drawing Sheets

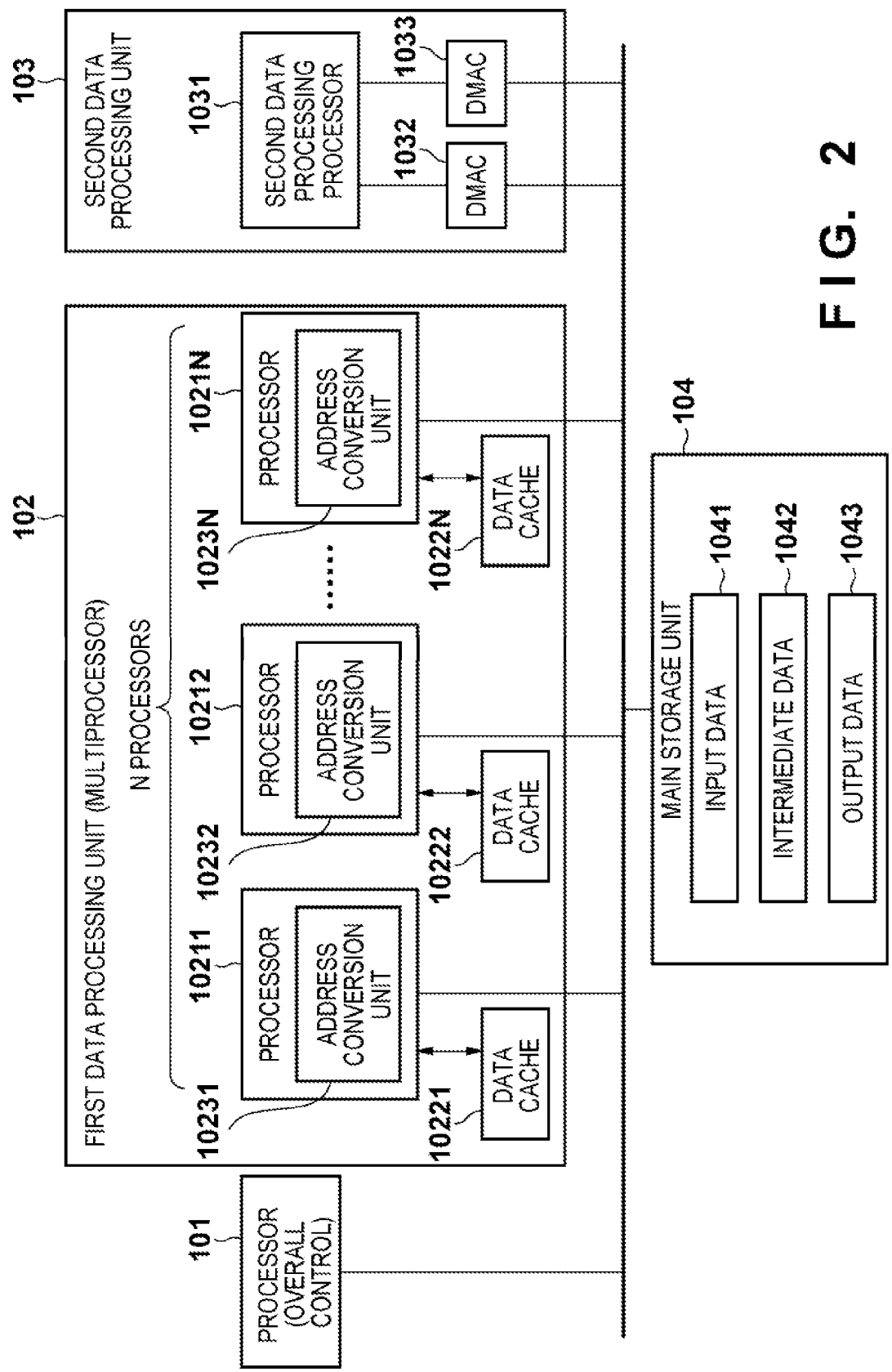
F I G. 2

PARALLEL PROCESSING OF TWO-DIMENSIONAL DATA, STORAGE OF PLURAL DATA OF THE PROCESSING RESULTS IN A CACHE LINE AND TRANSFER OF THE DATA TO A MEMORY AS IN THE CACHE LINE

BACKGROUND OF THE INVENTION

1. Field of the Invention

The present invention relates to data processing apparatuses and data processing methods.

2. Description of the Related Art

When processing image data in an image forming apparatus or the like, part of the processing is sometimes executed through software run by an integrated processor rather than through dedicated hardware. Executing the processing through software makes it possible to allot multiple functions to individual usage situations, and also makes the system as a whole flexible and adaptable, for adding additional functions and so on. Multiple processors are generally installed, and recent years have seen a trend toward increasing the number of processors even more. Using multiple processors makes it possible to execute multiple processes using a pipeline architecture and execute single processes in parallel.

Incidentally, software processes executed by integrated processors tend to require more time for processing than processes executed by dedicated hardware, which, in image forming apparatuses or the like, can easily result in bottlenecks in the processing time of the overall system. Therefore, there is a method, when multiple processors are installed, that divides a single piece of image data into regions and processes the resulting regions of the image data in parallel using the respective multiple processors. For example, Japanese Patent Laid-Open No. 2010-73210 (called "Patent Document 1" hereinafter) proposes a method in which JPEG compression and decompression are executed in parallel using multiple processors.

Typical processors currently in use have cache memories, and thus it is necessary to maintain cache coherence when multiple processors divide data into regions and output that data to a single common memory-type primary storage unit. Because the multiple processors each have individual data caches, transactions that maintain the coherence of the data between each cache line size are carried out. If the same cache line is read from/written to independently by multiple processors, there is the risk that other data will be mistakenly overwritten as a result of one of the writes. In response to this issue, there are methods for maintaining cache coherence, such as providing dedicated hardware as per Japanese Patent Laid-Open No. 08-185359 (called "Patent Document 2" hereinafter). If dedicated hardware is not provided, the system can guarantee that the same cache lines are not shared by multiple processors by matching the allocation of regions handled by the respective processors to the cache line size. Thus this method serves to maintain cache coherence.

In Patent Document 1, the output data is discrete, and there is no configuration for maintaining cache coherence.

Meanwhile, if a configuration such as that disclosed in Patent Document 2 is used in order to maintain cache coherence between caches for multiple processors, the number of transactions for maintaining the cache coherence will increase, which runs the risk of reducing the performance of the system as a whole.

Furthermore, if an attempt is made to maintain cache coherence by matching the allocation of regions handled by the respective processors to the cache line size, the data to be processed cannot be divided into units that are smaller than the cache line size. Thus, in a system having multiple processors, there will be processors that cannot handle parallel processing, which may make it difficult to achieve an increase in the processing speed corresponding to the number of processors.

SUMMARY OF THE INVENTION

The present invention provides a system and method that enable efficient parallel processing when dividing data into regions and processing those regions in parallel using multiple processors.

According to an aspect of the present invention, there is provided a data processing apparatus that carries out a first data process in parallel using multiple processors, stores the resulting data in a storage unit, and carries out a second data process on the data stored in the storage unit, the apparatus comprising: a first data processing unit that causes the multiple processors to carry out the first data process in parallel; an address conversion unit that, when the data processed in parallel by the first data processing unit is stored in the storage unit, converts the addresses of the data into addresses of the storage unit based on the data cache size of the multiple processors; and a second data processing unit that reads out the data stored in the storage unit and carries out the second data process on the read-out data.

Further features of the present invention will become apparent from the following description of exemplary embodiments (with reference to the attached drawings).

BRIEF DESCRIPTION OF THE DRAWINGS

FIG. 2 is a diagram illustrating details of the configuration example of the data processing system illustrated in FIG. 1.

DESCRIPTION OF THE EMBODIMENTS

Embodiments for carrying out the invention will be described in detail hereinafter with reference to the drawings.

First Embodiment

Figure 1:
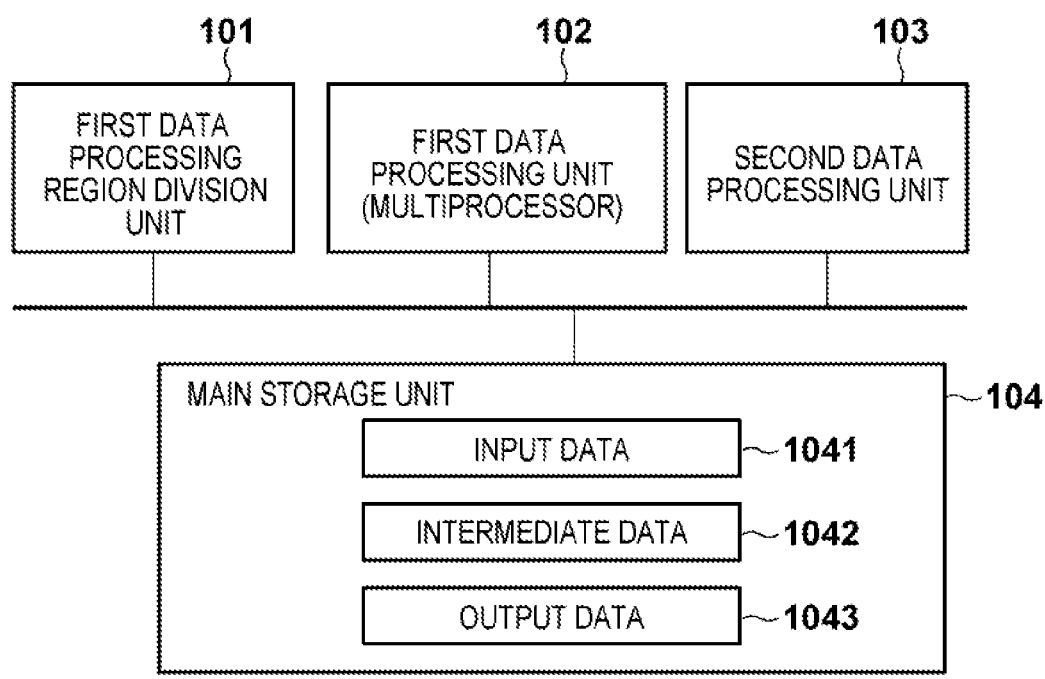
FIG. 1 is a diagram illustrating an example of the configuration of a data processing system according to a first embodiment.

FIG. 1 is a diagram illustrating an example of the configuration of a data processing system according to a first embodiment. A first data processing unit 102 is configured of multiple processors, and data processing is executed by each processor through software. A first data processing region division unit 101 is configured of a processor or the like that is separate from the first data processing unit 102, and carries out settings regarding region division so that the first data processing unit 102 can cause its multiple processors to carry out processes in parallel. Although a first data process 301 (see FIG. 3) executed by the first data processing unit 102 is a binarization process for image data, the present invention is not limited thereto, and may instead be a process that handles two-dimensional data (a filtering process, an scaling process, a conversion process, or the like).

A second data processing unit 103 is configured of a processor, dedicated hardware, and the like. A second data process 304 (FIG. 3) executed by the second data processing unit 103 is another separate image process that uses the result of the image processing carried out in the first data process 301. Here, this is assumed to be a JBIG compression process, but the present invention is not limited thereto, and may instead be another image process that processes data in, for example, raster order (a binarization process, a filtering process, or the like).

A main storage unit 104 is a common memory-type DRAM that can be read from and written to by the first data processing unit 102 and the second data processing unit 103, and in which various types of data are stored. In this example, input data 1041 is data on which the first data process 301 has not yet been executed, whereas intermediate data 1042 is data that has undergone the first data process 301 in an address conversion process 303 (FIG. 3) but on which the second data process 304 has not yet been executed. Output data 1043 is data on which the second data process 304 has been executed.

FIG. 2 is a diagram illustrating details of the configuration example of the data processing system illustrated in FIG. 1. The first data processing unit 102 is configured of N processors 10211, 10212, and so on up to 1021N. The N processors are provided with individual data caches 10221, 10222, and so on up to 1022N, and are assumed not to be provided with hardware or the like for maintaining data coherence between the processors. Here, the data caches 10221, 10222, and so on up to 1022N are write back data caches, and consistency is maintained for the data at the cache line size. The processors have address conversion methods 10231, 10232, and so on up to 1023N, which carry out address conversion when writing computation results into the shared main storage unit 104.

The second data processing unit 103 is configured of a second data processing processor 1031 and DMACs 1032 and 1033 for input/output transfer. The DMAC 1032 has a data redistribution function, and transfers the intermediate data 1042 from the main storage unit 104 to the second data processing processor 1031 so that the data is consistent with the address conversion. The DMAC 1033 transfers the output data 1043 generated by the second data processing processor 1031 (which serves as a JBIG compression unit) to the main storage unit 104.

The first data processing region division unit 101 includes a processor for controlling the data processing system as a whole; the first data processing region division unit 101 sets configuration parameters necessary for operations in the first data processing unit 102 and the second data processing unit 103, and controls the operations thereof. These configuration parameters will be described in detail later.

Figure 3:
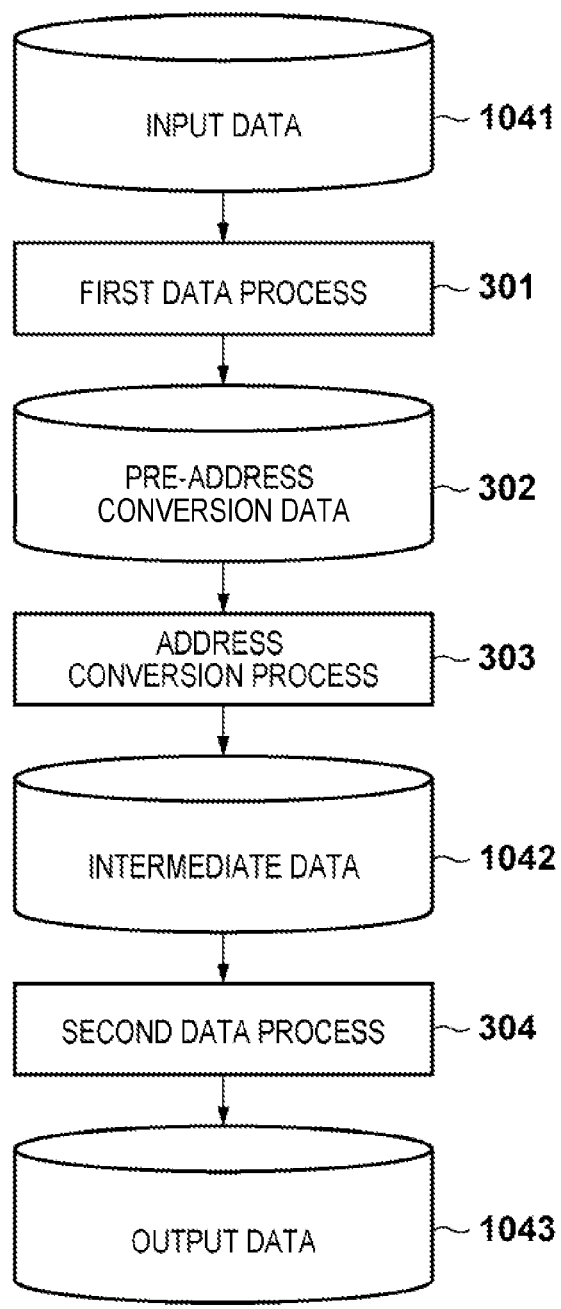
FIG. 3 is a diagram illustrating a flow of data processing according to the first embodiment.

FIG. 3 is a diagram illustrating the flow of data processing according to the first embodiment. The first data process 301 converts the input data 1041 into pre-address conversion data 302 (or generates pre-address conversion data based on the input data 1041). Next, the pre-address conversion data 302 is converted into intermediate data 1042 through the address conversion processes 303 executed by the respective processors. Here, because the first data process 301 and the address conversion process 303 are executed sequentially by the first data processing unit 102 in the present embodiment, the pre-address conversion data 302 is not written into the main storage unit 104. Finally, the second data process 304 converts the intermediate data 1042 into the output data 1043 (or generates the output data 1043 based on the intermediate data 1042).

Figure 4:
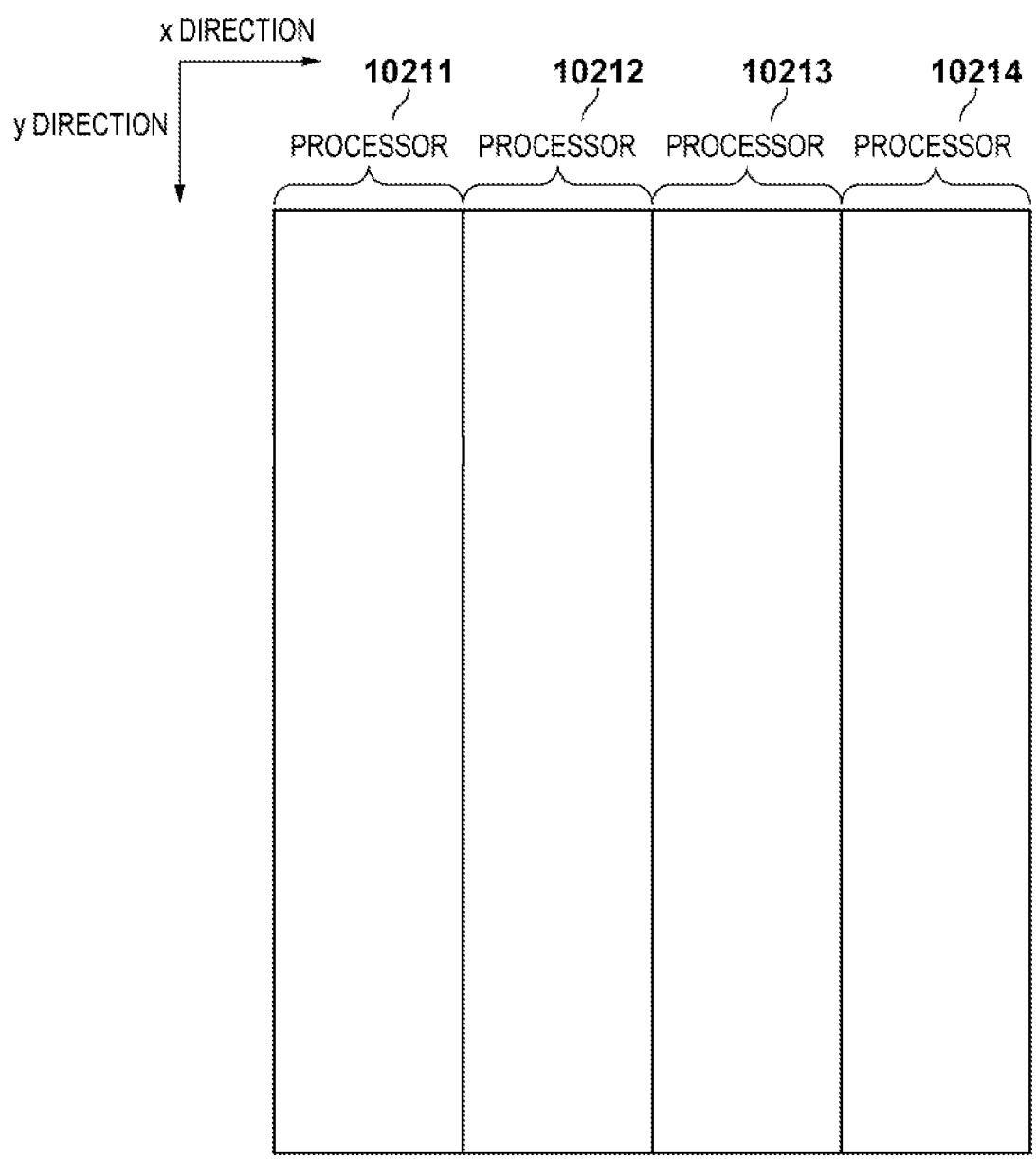
FIG. 4 is a diagram illustrating data divided into regions for processing by respective processors in a first data process.

FIG. 4 is a diagram illustrating data divided into regions for processing by respective processors in the first data process 301. FIG. 4 illustrates parallel processing carried out by four processors (processors 10211, 10212, 10213, and 10214). The data processed in parallel is two-dimensional bitmap data, and it is assumed that there is an x direction in which memory addresses are arranged continuously and a y direction to which an address offset based on the page width in the x direction is applied. In addition, the two-dimensional bitmap data is divided into strips in the x direction, and each processor executes the first data process 301. In the first data process 301, the processor processes the pixels arranged in the x direction in order, and then advances the processing in the y direction when the final pixel in the x direction has been processed.

Figure 5:
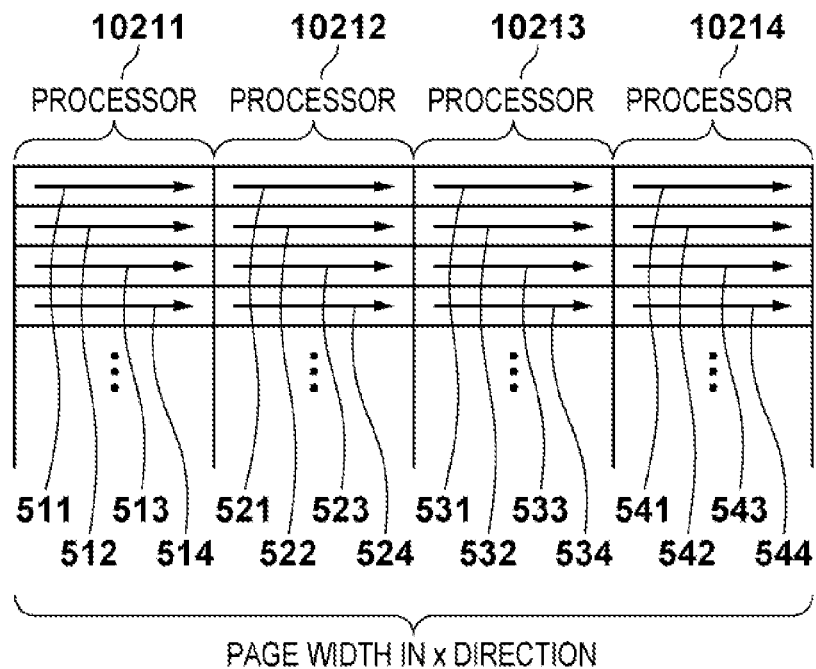
FIG. 5 is a diagram illustrating the arrangement of pre-address conversion data carried out in the first data process.

FIG. 5 is a diagram illustrating the arrangement of the pre-address conversion data 302 carried out in the first data process 301, and serves as an enlarged view of the content of FIG. 4. The processor 10211 first processes the data of the width in the x direction that is handled by the processor 10211, starting from the starting address, and the result of that processing (image data 511) is taken as the pre-address conversion data 302. Next, the data of the width in the x direction that is handled by the processor 10211 is processed from the address resulting from an offset equivalent to the page width in the x direction of the image being applied from the starting address of the image data 511. The processor 10211 processes image data 513 and 514 in order in the same manner thereafter.

The processor 10212 processes the data of the width in the x direction that is handled by the processor 10212, from the address resulting from an offset equivalent to the page width in the x direction handled by the processor 10211 being applied from the starting address. The result of this data processing (image data 521) is taken as the pre-address conversion data 302. Next, the data of the width in the x direction that is handled by the processor 10212 is processed from the address resulting from an offset equivalent to the page width in the x direction of the image from the starting address of the image data 521. The processor 10212 processes image data 523 and 524 in order in the same manner thereafter.

Note that the processors 10213 and 10214 also convert, or generate, the pre-address conversion data 302 by executing the same type of processes as the processors 10211 and 10212.

Figure 6:
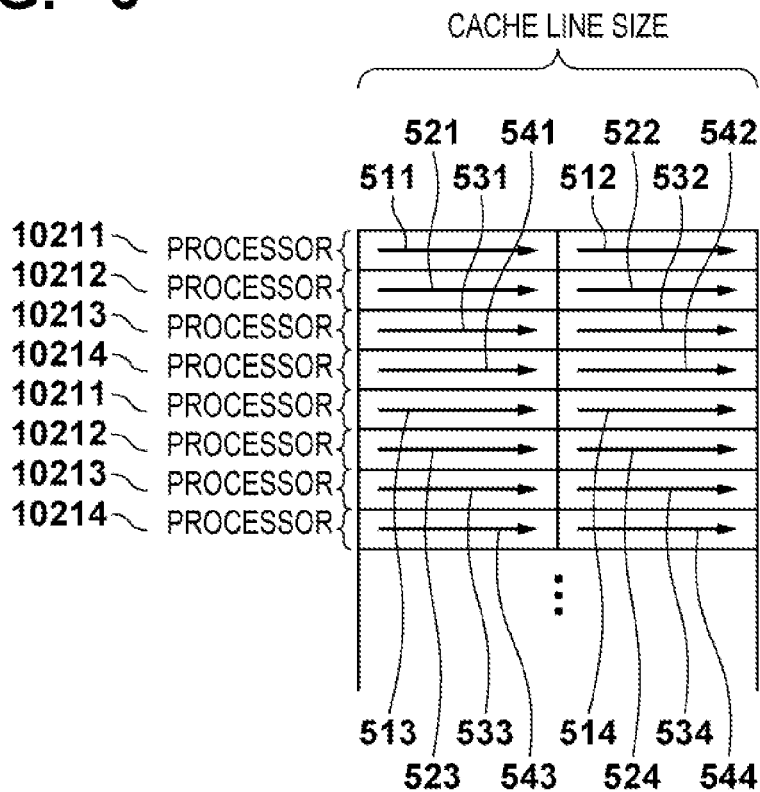
FIG. 6 is a diagram illustrating the order in which intermediate data is written as the result of an address conversion process.

FIG. 6 is a diagram illustrating the order in which the intermediate data 1042 is written as the result of the address conversion process 303. The processors 10211, 10212, 10213, and 10214 that configure the first data processing unit 102 carry out the address conversion process 303 when writing the processed image data as the intermediate data 1042. Here, a case is illustrated in which the width in the x direction handled by each processor is ½ the cache line size (a first size).

The processor 10211 writes the processed image data 511 from the starting address of the cache. The next image data 512 is not written into the address resulting from an offset equivalent to the page width in the x direction of the image being applied from the write starting address of the image data 511, but is instead written following the image data 511. In the first embodiment, the image data 511 and 512 correspond to a single cache line size. Meanwhile, the image data 521 processed by the processor 10212 is written into the address resulting from an offset equivalent to a single cache line size being applied from the starting address of the cache. The next image data 522 is written following the image data 521. The image data 521 and 522 also correspond to a single cache line size. Thereafter, the same is applied to the image data 531 and 532 processed by the processor 10213 and the image data 541 and 542 processed by the processor 10214.

Next, the image data 513 processed by the processor 10211 is written into an address resulting from applying, from the starting address, an offset equivalent to the cache line size x the number of processors. The image data 523 and 524 processed by the processor 10212, the image data 533 and 534 processed by the processor 10213, and the image data 543 and 544 processed by the processor 10214 that follow the image data 514 are written in the same manner.

Figure 7:
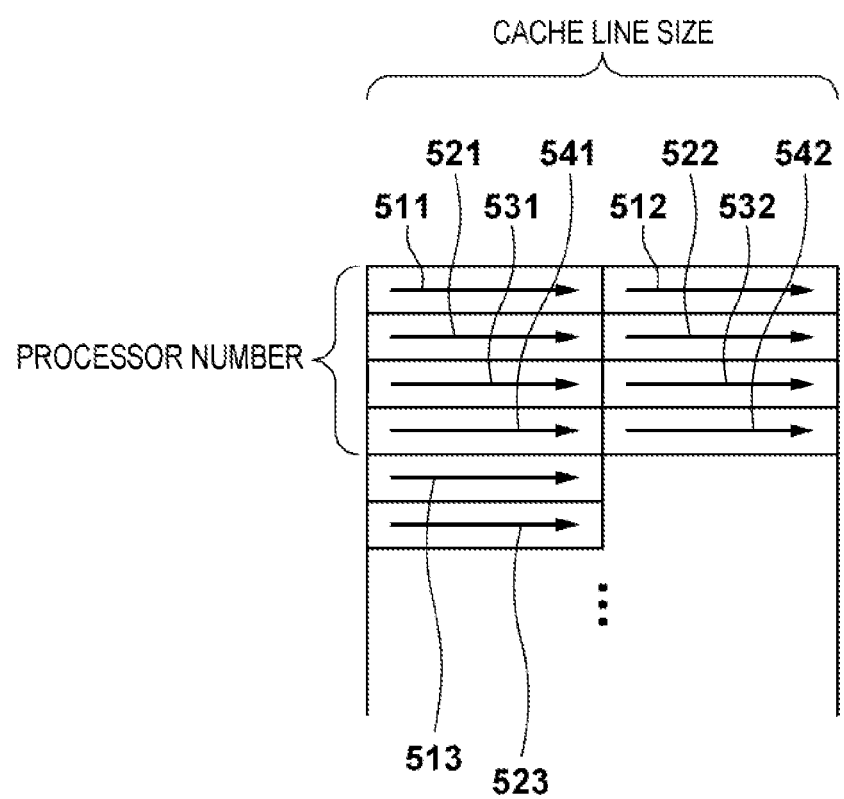
FIG. 7 is a diagram illustrating a readout order for a second data processing unit according to specific parameters.

FIG. 7 is a diagram illustrating a readout order for the second data processing unit 103 according to specific parameters. The intermediate data 1042 written into the main storage unit 104 through the address conversion process 303 has a different arrangement than two-dimensional raster data (or bitmap data). In the present embodiment, the second data process 304 is a JBIG compression process, and thus it is assumed that the second data processing processor 1031 requires data in two-dimensional raster order.

Therefore, it is necessary for the direct memory access controller 1032 (called "DMAC 1032" hereinafter), which includes the data redistribution function, to read data that is consistent with the address conversion process 303; this is realized by employing a DMAC capable of rectangular transfer. "Rectangular transfer" refers to transferring two-dimensional image data in units of a given rectangular size (a second size). Specifically, first, the image data 511, 521, 531, and 541 are transferred in that order. In other words, the rectangular size is equivalent to (width in x direction handled by processor)×(number of processors).

Next, the image data 512, 522, 532, and 542 are transferred in that order as a rectangular size. The image data 513, 523, and so on are also transferred thereafter in the same manner. Thus as described above, the rectangular transfer process performed by the DMAC 1032 transfers the data in two-dimensional raster order to the second data processing processor 1031.

The foregoing has described a case in which the page width is twice the cache line size and the processing is divided among four processors. However, the present invention can also be applied in configurations aside from those described above. Next, a generalized example in which the number of processors, the page width, the cache line size, and so on are implemented as parameters will be described.

Figure 8:
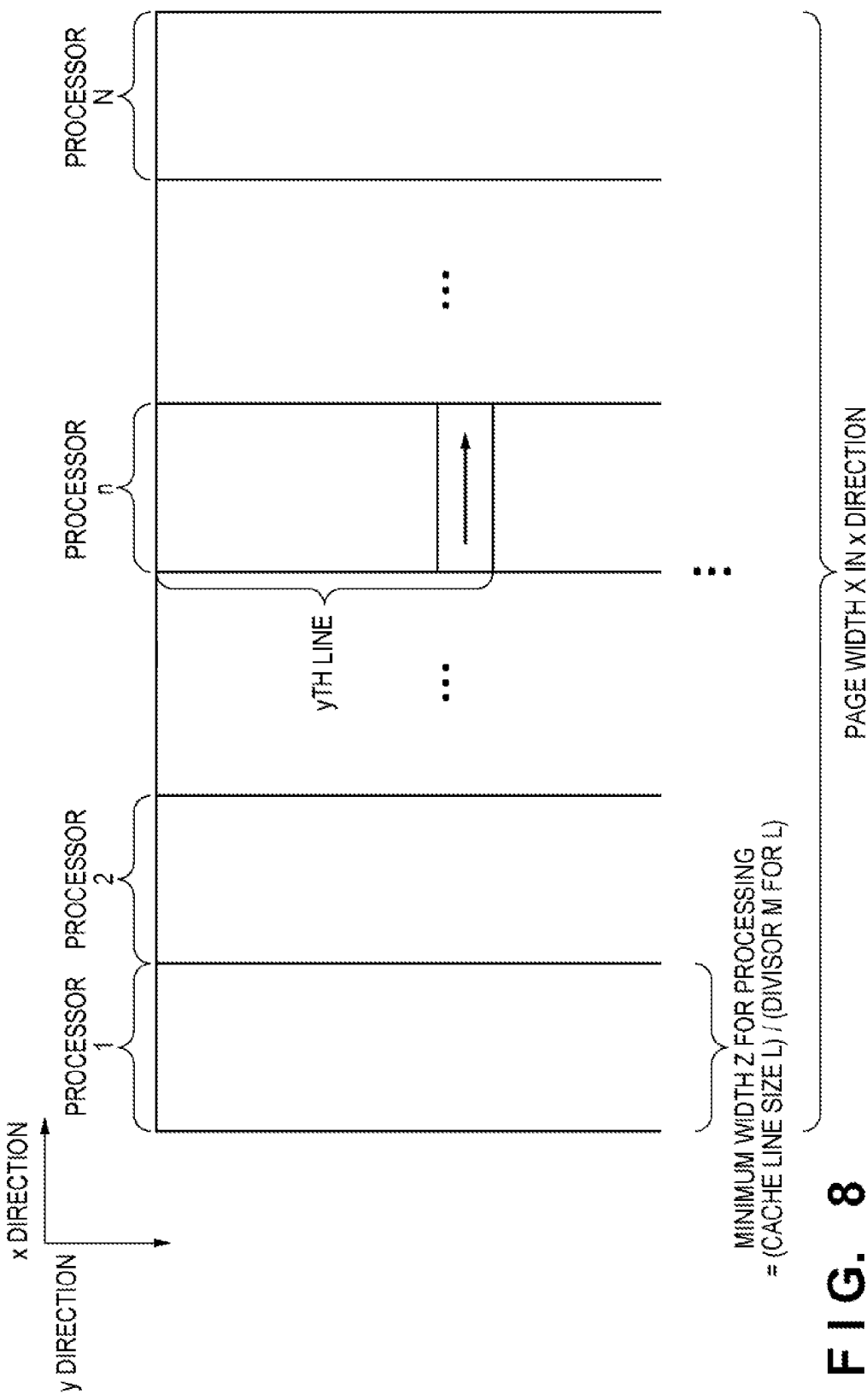
FIG. 8 is a diagram illustrating general parameters for pre-address conversion data.

FIG. 8 is a diagram illustrating general parameters for the pre-address conversion data 302. The number of the processor of interest is generally represented by n, which is a variable expressing one of the N processors. Meanwhile, the number of the line of interest in the two-dimensional bitmap is generally taken as y, which is a variable expressing a single line in the y direction. Furthermore, the number of processors is taken as N, the page width is taken as X, and the cache line size is taken as L.

Note that the page width X is embedded in advance with given data in order to be a multiple of the cache line size, in order to carry out the present invention. Meanwhile, in the case where the intermediate data is, for example, RGB image data, in which one pixel is configured of three bytes and thus needs to be handled in x-byte units, the least common multiple of the cache line size L and x is set as the new cache line size. Here, the divisor of the cache line size L is taken as M. In the case where N>X/L, the processing cannot be allocated among all of the processors, and thus M is used; by finding the minimum value of M where N<<M×X/L holds true, the processing call be allocated among all of the processors.

However, this is only one example of a method for determining M, and it is not necessary to restrict M to the minimum value according to the conditions described above as in this example; any value may be used as long as it is a divisor of L. Furthermore, by setting M, the present invention may also be applied even in the case where N<X/L. The minimum width for the processing carried out by a processor is defined as Z. Here, Z=L/M.

In the case where the processor number N is M×X/L, the processing is carried out by allocating the minimum width Z for processing among all of the processors. However, in the case where N<M×X/L, some of the processors process a width that is several times the minimum width Z for processing. The rule for the address conversion process 303 in this case is the same as for an address conversion process in the case where, for example, there are M×X/L processors. Therefore, an example of a case where N=M×X/L will be described here.

Figure 9:
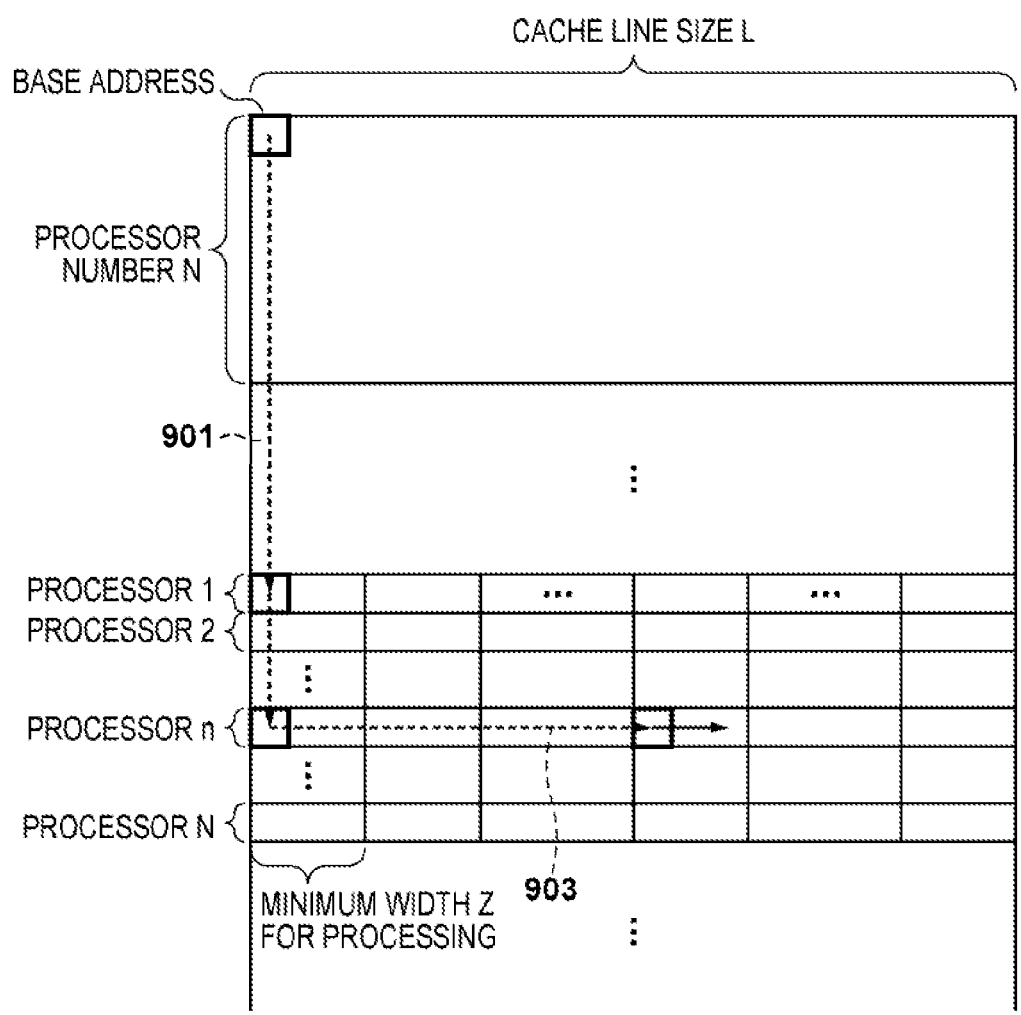
FIG. 9 is a diagram illustrating the generation of intermediate data according to general parameters.

FIG. 9 is a diagram illustrating the generation of the intermediate data 1042 according to general parameters. The processing result of the yth line by the processor n shown in FIG. 8 is written into an address resulting from applying the following three offsets from the base address into which the intermediate data 1042 is written. Here, QUOTIENT(A, B) represents the quotient when A is divided by B, whereas MOD(A, B) represents the remainder when A is divided by B.

offset 901: L×N×QUOTIENT((y−1), M)
offset 902: L×(n−1)
offset 903: Z×MOD((y−1), M)

In this manner, there are three offsets. The offset 901 illustrates the number of cache line size L×the processor number N. Because the cache line size as configured of M minimum widths Z, the number of cache line size L×the processor number N can be found by dividing the line number y by M. The offset 902 indicates an offset that depends on the number of processors. This offset can be found by multiplying the cache line size L by the processor n of interest. Finally, the offset 903 indicates an offset that depends on the fractional figure of the line number y. This offset can be found by multiplying the minimum width Z for processing by the remainder of dividing the line number y by M.

Figure 10:
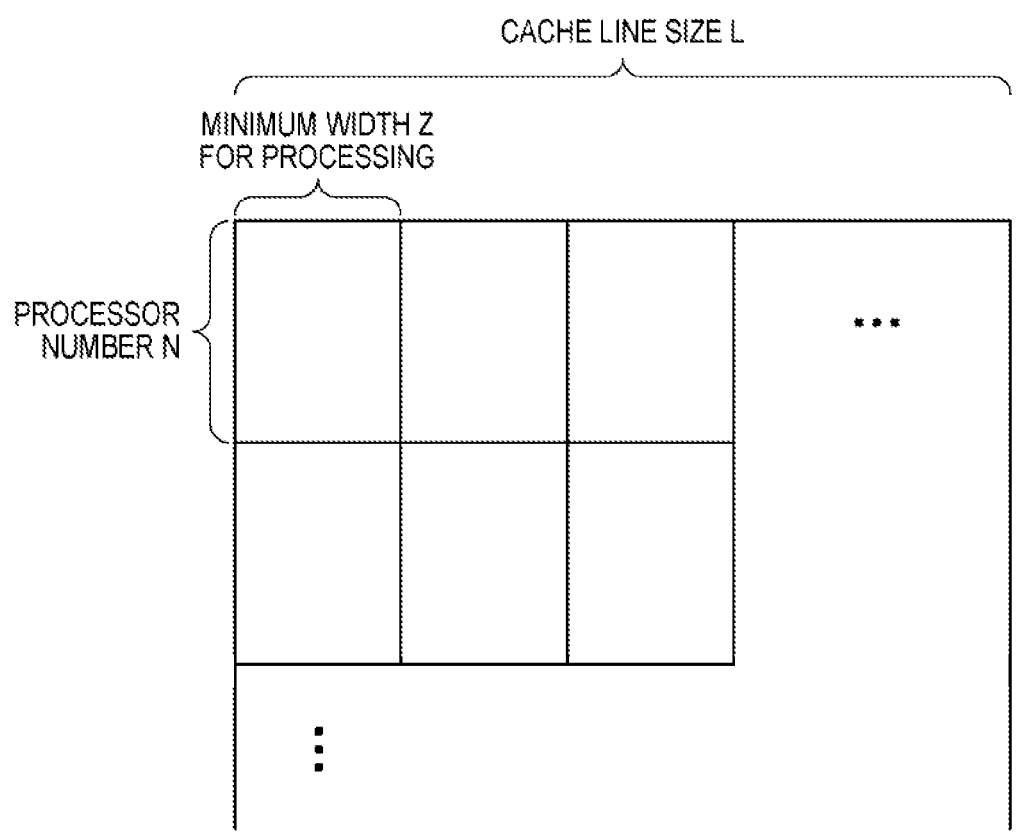
FIG. 10 is a diagram illustrating the reading of intermediate data by the second data processing unit.

FIG. 10 is a diagram illustrating the reading of intermediate data by the second data processing unit 103 according to the general parameters described in the first embodiment. For the reasons illustrated in FIG. 7, it is necessary for the DMAC 1032 to read data that is consistent with the address conversion process 303 in the second data process 304, which is realized by employing a DMAC that is capable of rectangular transfer. The parameters used at this time assume that the page width is the cache line size L and that the unit of rectangular reading is (minimum width Z for processing×processors N). Configuring the page size and the rectangular reading unit makes it possible to carry out the reading in rectangular units. Because methods for reading rectangular units are publicly known, descriptions thereof will be omitted.

According to the first embodiment, when dividing data into regions for the first data process 301 and processing that data in parallel using multiple processors, the units into which the data to be processed is divided can be made smaller than the cache line size. Furthermore, even in the case where data that is in raster data order is necessary for the second data process 304, it is possible to attain consistency therein.

Second Embodiment

Next, a second embodiment according to the present invention will be described in detail with reference to the drawings. Note that the configuration of the data processing system according to the second embodiment is the same as that of the first embodiment shown in FIG. 1, and thus descriptions thereof will be omitted.

In the second embodiment, the second data process 304 (FIG. 3) executed by the second data processing unit 103 is a JPEG compression process. Accordingly, the second data processing processor 1031 shown in FIG. 2 has a JPEG compression function. However, the present invention is not limited thereto, and the second data process 304 may be a different image process that carries out data processing in rectangular units. For example, the process may be a spooling process that spools print images in rectangular units.

The processing up until the intermediate data 1042 is outputted to the main storage unit 104 as shown in FIG. 3 is the same as that in the first embodiment. In the second embodiment, the order in which the DMAC 1032 reads out data from the intermediate data 1042 in the second data process 304 differs from that in the first embodiment.

Figure 11:
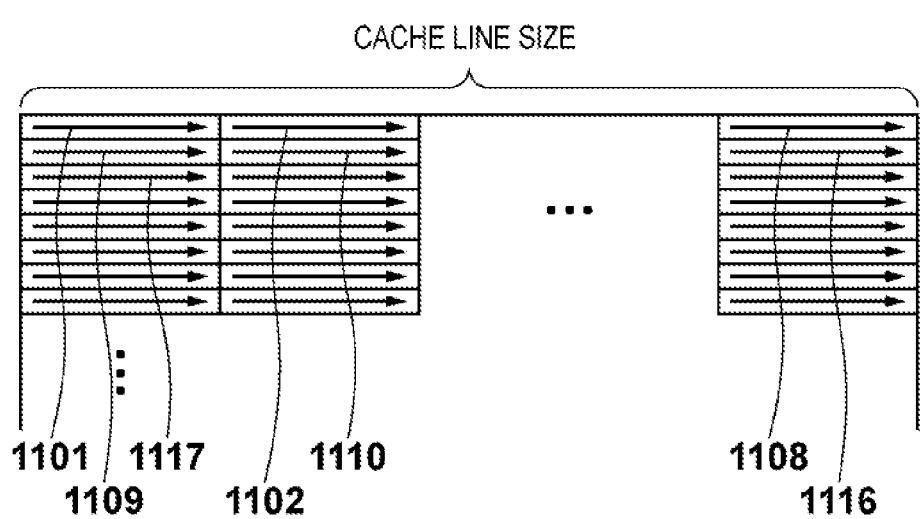
FIG. 11 is a diagram illustrating a readout order for a second data processing unit according to a second embodiment.

FIG. 11 is a diagram illustrating a readout order for the second data processing unit 103 according to the second embodiment. That the intermediate data 1042 in the main storage unit 104 has a different arrangement than two-dimensional raster data due to the address conversion process 303 is the same as in the first embodiment. Here, it is assumed that the second data process 304 is a JPEG compression process, and that second data processing hardware 1031 requires data in rectangle units.

For this reason, it is necessary to readout data consistent with the address conversion process 303, but these stipulations can be achieved simply by transferring the intermediate data 1042 to the DMAC 1032 in raster order. In other words, the DMAC 1032 reads the raster data in the following order, as shown in FIG. 11: image data 1101, 1102, . . . , 1108, 1109, 1110, . . . , 1116, 1117, and so on.

Note that as described above, in order for the data redistribution to be carried out automatically through the raster transfer carried out by the DMAC 1032, it is necessary for the minimum width Z for processing by the processors to match the MCU (minimum coded unit) of JPEG compression. As described in the first embodiment, the divisor M for the cache line size L, which is a basis for determining the minimum width Z for processing, can be set as desired. The minimum width Z for processing is set to match the MCU of JPEG compression by setting M as appropriate in this manner.

According to the second embodiment, it is possible to read data consistent with the address conversion process 303 even in the case where the second data process 304 requires data in rectangular units.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-108733, filed May 13, 2011, which is hereby incorporated by reference herein in its entirety.

What is claimed is:

1. A data processing apparatus comprising:
 a plurality of processing units that process, in parallel and in units of a predetermined width, input data that is arranged in two-dimensional array form, which input data is read out from a main memory, wherein (a) each of the processing units has a cache memory, (b) the predetermined width is the width of one direction of a two-dimensional array to be processed by each of the plurality of processing units, and (c) the predetermined width is smaller than a cache line width of the cache memory; and
 a control unit that stores in a cache line of the cache memory, in accordance with the cache line width of the processing unit, data of the processing results of the processing unit, wherein the data of the processing results includes a plurality of pieces of data of the predetermined width,
 wherein, for each of the plurality of processing units, the control unit transfers, to the main memory, the data of the processing results stored in the respective cache memory of the processing unit, such that the data of the processing results is transferred together as in the cache line of the respective cache memory.

2. The apparatus according to claim 1, further comprising a data processing unit that reads out the data of processing results stored in the main memory and carries out a second data process on the read-out data of processing results.

3. The apparatus according to claim 2, wherein the data processing unit reads out the data of processing results stored in the storage unit line-by-line.

4. The apparatus according to claim 2, wherein the data processing unit reads out two-dimensional data of processing results from the storage unit in units each having a particular two-dimensional size.

5. The apparatus according to claim 1, wherein the input data is stored in a first area of the main memory, and the data of processing results is stored in a second area of the main memory.

6. The apparatus according to claim 1, wherein the predetermined width is less than or equal to half the cache line width.

7. A data processing method performed by a data processing apparatus comprising a plurality of processing units that process, in parallel and in units of a predetermined width, input data that is arrayed two-dimensionally, the input data being read out from a main memory, wherein (a) each of the processing units has a cache memory, (b) the predetermined width is the width of one direction of a two-dimensional array to be processed by each of the plurality of processing units, and (c) the predetermined width is smaller than a cache line width of the cache memory, the method comprising:
 storing in a cache line of the cache memory, in accordance with the cache line width of the processing unit, data of the processing results of the processing unit, wherein the data of the processing results includes a plurality of pieces of data of the predetermined width; and transferring to the main memory, for each of the plurality of processing units, the data of the processing results stored in the respective cache memory of the processing unit, such that the data of the processing results is transferred together as in the cache line of the respective cache memory.

\* \* \* \* \*